United States Patent [19]

Wolfrum et al.

[11] Patent Number: 4,664,904
[45] Date of Patent: May 12, 1987

[54] PROCESS FOR THE PERFORMANCE OF CHEMICAL REACTION WITH ATOMIC HYDROGEN

[75] Inventors: Jürgen Wolfrum, Rosdorf; Jürgen Warnatz, Neckarsteinach; Hartmut Bruderreck, Gelsenkirchen-Buer; Klaus Gottlieb, Herdecke-Ende; August-Wilhelm Preuss, Dorsten, all of Fed. Rep. of Germany

[73] Assignee: Veba Oel Ag, Gelsenkirchen-Buer, Fed. Rep. of Germany

[21] Appl. No.: 779,616

[22] Filed: Sep. 25, 1985

Related U.S. Application Data

[63] Continuation of Ser. No. 486,822, Apr. 20, 1983, abandoned.

[30] Foreign Application Priority Data

May 3, 1982 [DE] Fed. Rep. of Germany ....... 3216391

[51] Int. Cl.$^4$ ............................................. C01B 3/02
[52] U.S. Cl. ............................................. 423/648 R
[58] Field of Search ................................... 423/648 R

[56] References Cited

FOREIGN PATENT DOCUMENTS 301364 7/1920 Fed. Rep. of Germany .

OTHER PUBLICATIONS

Chemical Abstract No. 28,964r; *Chemical Abstracts* A.C.S; vol. 69, No. 8, p. 2714 (1968).
Chemical Abstract No. 18, 277z; *Chemical Abstracts* A.C.S. vol. 76, No. 4, p. 263 (1972).
Chemical Abstract No. 126,977j; *Chemical Abstracts* A.C.S.; vol. 88, No. 18, p. 373 (1978).
Chemical Abstract No. 121,638k, *Chemical Abstracts* A.C.S.; vol. 89, No. 14, p. 829 (1978).
Thrush, B. A.; "Atom Reactions in Flow Tubes"; *Science*, vol. 196, pp. 470 to 473 (4/67).
Baldwin, R. D. et al., "Kinetics of Hydrogen–Oxygen and Hydrocarbon–Oxygen Reaction" Final Report Mar. 1977, #77–1271, Air Force Office of Scientific Research.
Gordon E. B. et al., "Measurement of the Cross Sections of Spin Exchange of H Atoms on Paramagnetic $O_2$, NO and $NO_2$ Molecules in the Temperature Interval 310°–390° K. ZhETF Dis. Red. 17, No. 10, pp. 548–551, May 1973.
Bulewicz E. M. et al., "Catalytic Effect of Metal Additives on Free Radical Recombination Rates in $H_2+O_2+N_2$ flames" Kinetics of Elementary Chemical Reaction Symposium Int. on Combustion Proceedings (13th) 1971 pp. 73–80.
Hagert J. et al., "Concentration Profile of H Radicals in the $H_2-O_2$ Flame", Collogue Ampere Proceedings, vol. 14, pp. 539–543 (1967).
Talrore V. L. "Advances in the Mass Spectrometry of Free Radicals" Advances in Macs Spectrometry, vol. 7A(1978).

*Primary Examiner*—Christopher W. Brody
*Attorney, Agent, or Firm*—Oblon, Fisher, Spivak, McClelland & Maier

[57] ABSTRACT

Atomic hydrogen for chemical reaction is produced in relatively high concentrations by the combustion of molecular hydrogen with a substoichiometric quantity of oxygen. The chemical reactant is supplied at the point of the development of the atomic hydrogen. Combustion is effected at pressures between 10 mbar and 1.5 bar, with a mole ratio of molecular hydrogen to molecular oxygen of 2.3 to 5.0.

5 Claims, 2 Drawing Figures

PROCESS FOR THE PERFORMANCE OF CHEMICAL REACTION WITH ATOMIC HYDROGEN

This application is Continuation, of application Ser. No. 486,822, filed Apr. 20, 1983, now abandoned.

BACKGROUND OF THE INVENTION

1. Field of the Invention

This invention relates to a process for the generation of atomic hydrogen. This invention also relates to a process for performing chemical reactions with the participation of atomic hydrogen by the initiation and propagation of chain reactions.

2. Description of the Prior Art

For applications in technical processes it is necessary to produce atomic hydrogen in a high but controllable concentration. Further, it is desirable to produce atomic hydrogen by as simple an arrangement as possible and with minimal energy consumption. However, all the processes currently employed for the production of atomic hydrogen produce atomic hydrogen in relatively low concentrations and with high energy consumption.

The use of atomic hydrogen for the steam cracking of hydrocarbons in the production of olefins is described in JA-AS No. 72 43 522. In this instance, atomic hydrogen was produced by heating molecular hydrogen to 2900° C. with a plasma flow. In spite of the high temperature, which must be produced by high energy processes, the heated molecular hydrogen contains only 5% atomic hydrogen.

According to other processes described in JA-AS No. 72 43 522, atomic hydrogen may be produced by the decomposition of an additional component in the presence of molecular hydrogen. The additional components are hydrocarbons and other organic compounds of low-molecular weight. Upon decomposition, the added component yields radicals which produce atomic hydrogen from molecular hydrogen in subsequent steps. The decomposition may be effected by pyrolysis or partial combustion of the additive.

Other processes, used particularly in basic research, produce atomic hydrogen by silent electric discharges in molecular hydrogen, by photolysis of hydrogen-containing compounds, and by microwave discharges upon molecular hydrogen in an inert medium. However, all of these processes for the production of atomic hydrogen produce atomic hydrogen in relatively low concentrations and with high energy consumption.

SUMMARY OF THE INVENTION

Accordingly, it is an object of this invention to provide a process for the generation of atomic hydrogen in relatively high concentration.

It is also an object of this invention to provide a process for the generation of atomic hydrogen in a controllable concentration.

Further, it is an object of the present invention to provide a process for the generation of atomic hydrogen with relatively low consumption of energy.

Moreover, it is also an object of this invention to provide a process for the performance of chemical reactions with the participation of atomic hydrogen.

According to the present invention, the foregoing and other objects are attained by providing a process for the performance of chemical reactions with the participation of atomic hydrogen, which involves generating atomic hydrogen by the combustion of molecular hydrogen with a substoichiometric quantity of oxygen at pressures between about 10 mbar and 1.5 bar. The atomic hydrogen generated thereby is then mixed with a chemical reactant, which is capable of forming a free radical by reaction with atomic hydrogen, at the point of development of the atomic hydrogen.

BRIEF DESCRIPTION OF THE DRAWINGS

Other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

According to the invention, atomic hydrogen is produced in a high, but controllable concentration, in a simple process, with low consumption of energy, by the combustion of molecular hydrogen with a substoichiometric quantity of oxygen. Pure oxygen as well as air may be used as the oxygen source.

In the hydrogen-oxygen flame, the combustion of hydrogen occurs as a chain reaction. High hydrogen atom concentrations are developed in the secondary reaction zone of the flame due to the excess of hydrogen. The concentration of the hydrogen atoms may be controlled by the variation of the hydrogen to oxygen ratio and, at the same time, the concentration of oxygen-containing radicals may be completely suppressed. Generally, an $H_2/O_2$ mole ratio of 2.3 to 5.0, preferably 2.8 to 4.0 is utilized. The life of the hydrogen atoms produced may be controlled by the geometry of the burner arrangement and by variations of the pressure in the burner chamber.

With the present invention, chemical reactants may be mixed with the generated atomic hydrogen, directly at the point of development of the hydrogen atoms, particularly in the secondary reaction zone. The mixing is done in such a way that the production of atomic hydrogen is not influenced by it.

In JA-AS No. 72 43 522, the partial combustion of methane is also described for the formation of hydrocarbon radicals. The hydrocarbon radicals react with molecular hydrogen, which is added from outside, to form atomic hydrogen. However, with this manner of producing hydrogen atoms, radicals develop as by-products, thereby triggering undesirable side reactions. Moreover, in JA-AS No. 72 43 522, the formed final reaction mixture of the burner, containing only small amounts of hydrogen atoms, is supplied into a separate second process stage. In this second stage, a mean distillate blend (182°–255° C.) is subjected to a reaction with the above-described reaction mixture at 800° C. with a transit period of 0.72 seconds.

Figure 1:
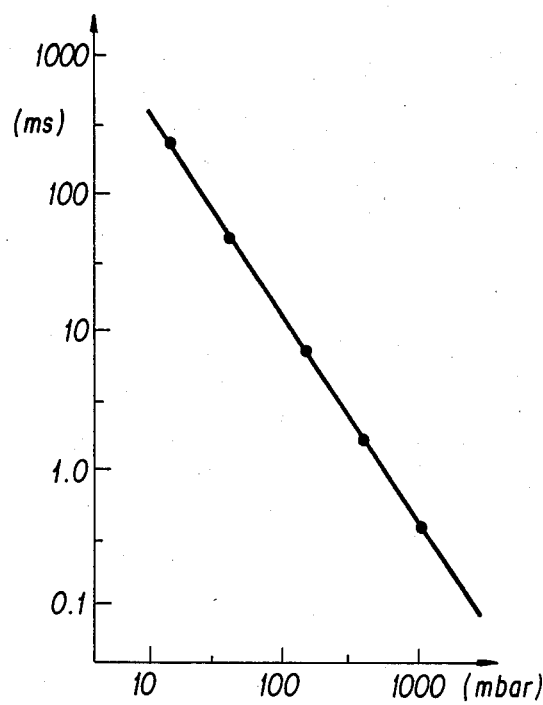
FIG. 1 illustrates the half-life value of hydrogen atoms, represented in ms for a hydrogen-air flame, as a function of the pressure in mbar.
Figure 2:
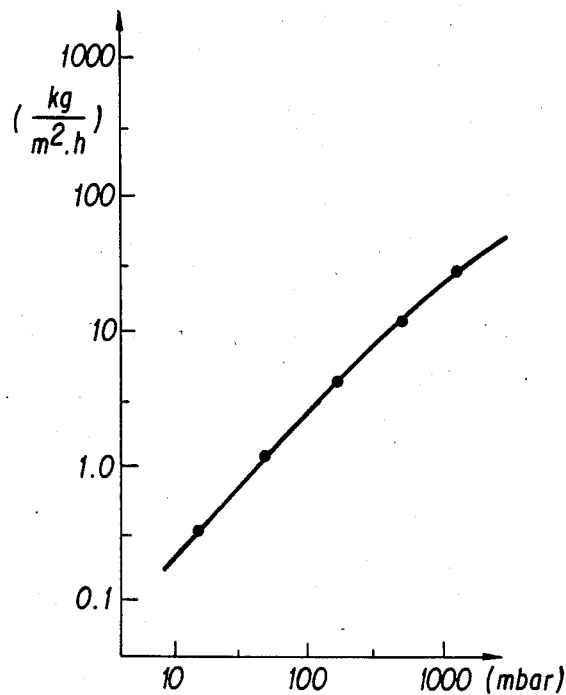
FIG. 2 illustrates the hydrogen atom flow in kg/m$^2$h also for a hydrogen-air flame as a function of the pressure in mbar.

In the present invention, hydrogen atoms are produced in a fuel-rich hydrogen-oxygen or hydrogen-air flame, particularly at a negative pressure. For this purpose, either a premixed flame (with corresponding safety precautions) is used or the flame is stabilized on a multidiffusion burner. Depending on the level of the set pressure, hydrogen atom concentrations are developed in the secondary reaction zone of the flame of up to 30 percent by mole. The life of the hydrogen atoms lies between 300 ms and 0.3 ms at pressures from 10 mbar to atmospheric pressure. In FIG. 1, the half-life value of the hydrogen atoms is represented in ms for a hydrogen-air flame as a function of the pressure in mbar. The flow of hydrogen atoms is between 0.3 kg/m$^2$h and 300 kg/m$^2$h in this pressure range. FIG. 2 shows the hydrogen atom flow in kg/m$^2$h also for a hydrogen-air flame as a function of the pressure in mbar.

In order to obtain a maximum output, an optimum pressure must be selected. A high flow of hydrogen atoms having a sufficiently long life is required in order to achieve a complete intimate mixing with the reactant. Generally, the most favorable pressure is between 10 and 1500 mbar and the range from 10 to 900 mbar, particularly from 50 to 500 mbar, is preferred. If the intimate mixing is effected by means of diffusion processes, the most favorable pressure is, for example, 400 mbar for a hydrogen-air flame. In this case, a hydrogen atom flow of 10 kg/m$^2$h may be produced. The most favorable temperature for the reaction is adjusted by means of a suitable device, such as a heat exchanger, in the reactant supply line.

Atomic hydrogen is suitable for the initiation and propagation of the dehydrogenation of alkanes, the hydrogenation of alkenes, the cracking of hydrocarbons, the cleavage of alkyl groups from alkyl aromatics, and the formation of hydrazine from ammonia. Atomic hydrogen generated by the process of the present invention may, therefore, be used in performing such free radical chemical reactions.

Obviously, many modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A process for performing free radical chemical reactions with the participation of atomic hydrogen which comprises:
   (a) generating atomic hydrogen in a flame having at least two zones therein by the combustion of molecular hydrogen with a substoichiometric quantity of oxygen or air, such that the molar ratio of molecular hydrogen or molecular oxygen is in the range of 2.3:1 to 5.0:1, at pressures between 10 mbar and 1.5 bar, and subsequently
   (b) mixing the generated atomic hydrogen in the secondary raction zone of the flame with a chemical reactant, which is capable of forming a free radical by reaction with atomic hydrogen.

2. A process according to claim 1, wherein the combustion of the molecular hydrogen is effected at pressures between about 10 and 900 mbar.

3. A process according to claim 1, wherein the combustion of the molecular hydrogen is effected at pressures between about 50 and 500 mbar.

4. A process according to claim 1, wherein the mole ratio of molecular hydrogen to molecular oxygen is in the range of 2.8 to 4.0.

5. The process according to claim 1, wherein said atomic hydrogen is generated in the secondary reaction zone of the flame.

* * * * *